United States Patent
Karlsson

(10) Patent No.: US 6,595,729 B2
(45) Date of Patent: Jul. 22, 2003

(54) DRILL WITH COUNTERSINKER FOR CHIP REMOVING MACHINING

(75) Inventor: Ronny Karlsson, Valdemarsvik (SE)

(73) Assignee: Seco Tools AB, Sandviken (SE)

(*) Notice: Subject to any disclaimer, the term of this patent is extended or adjusted under 35 U.S.C. 154(b) by 61 days.

(21) Appl. No.: 09/962,083

(22) Filed: Sep. 26, 2001

(65) Prior Publication Data

US 2002/0041798 A1 Apr. 11, 2002

(30) Foreign Application Priority Data

Sep. 28, 2000 (SE) .............................. 0003462

(51) Int. Cl.⁷ .............................. B23B 51/02
(52) U.S. Cl. .................. 408/118; 408/191; 408/224; 408/713
(58) Field of Search ............... 408/118, 224, 408/225, 230, 713, 200, 191, 193

(56) References Cited

U.S. PATENT DOCUMENTS

| | | | |
|---|---|---|---|
| 2,959,075 A | * 11/1960 | Mueller | 408/191 |
| 3,063,312 A | * 11/1962 | Mueller | 408/191 |
| 3,575,520 A | 4/1971 | Halpern | |
| 3,635,573 A | 1/1972 | Halpern | |
| 4,533,285 A | * 8/1985 | Jorgensen | 408/191 |
| 4,580,933 A | 4/1986 | Wilkins | |
| 5,211,635 A | * 5/1993 | Omi et al. | 408/224 |
| 6,200,078 B1 | * 3/2001 | Kubota | 409/74 |

FOREIGN PATENT DOCUMENTS

| | | | | |
|---|---|---|---|---|
| DE | 3610016 A1 | * 10/1987 | | 408/224 |
| DE | 40 12 067 | 10/1991 | | |
| EP | 0391695 A1 | * 10/1990 | | 408/224 |
| EP | 0 520 111 | 12/1992 | | |
| FR | 2359670 A | * 3/1978 | | 408/224 |
| JP | 041809 | * 2/1990 | | 408/224 |
| SE | 620 052 | 7/1925 | | |

* cited by examiner

Primary Examiner—Daniel W. Howell
(74) Attorney, Agent, or Firm—Burns, Doane, Swecker & Mathis, LLP

(57) ABSTRACT

A tool for chip removing machining includes a drill and a countersinker mounted thereto. The countersinker comprises two half-sections that are clamped to each other and to the drill. The drill includes helical flutes defining respective chip-removal channels. Each half-section includes a connection portion received in a respective flute of the drill. The connection portion has a shape generally corresponding to that of the chip flute, so as to be form-locked within the flute. Each connection portion includes a convex surface facing the flute, and a concave surface facing away from the convex portion. The convex surface can be pressed against the concave wall of the flute, whereby the concave surface forms a section of a wall of a respective chip-removal channel.

17 Claims, 4 Drawing Sheets

DRILL WITH COUNTERSINKER FOR CHIP REMOVING MACHINING

This application claims priority under 35 U.S.C. §§119 and/or 365 to Patent Application No. 0003462-9 filed in Sweden on Sep. 28, 2000.

TECHNICAL FIELD OF THE INVENTION

The present invention relates to a tool for chip removing machining, said tool comprising a drill and a countersinker mounted thereto. The countersinker has at least one cutting insert for chip removing machining. The drill is provided with at least one chip flute which extends in the axial direction of the drill. The invention also relates to a countersinker, per se.

PRIOR ART

Through U.S. Pat. No. 3,575,520 is previously known a tool comprising a drill on which a countersinker is provided. The countersinker has an internal hole and a radial slot that extends from the internal hole to the external peripheral surface. The diameter of the internal hole of the countersinker conforms in principle to the external diameter of the drill. The radial slot allows the internal diameter of the countersinker to be somewhat widened, which in turn allows the countersinker to be pushed onto the drill in its axial direction. The countersinker is fixed on the drill by a screw in the area of the radial slot clamping the countersinker around the drill, i.e. the countersinker is fixed relative to the drill by means of friction between the internal hole of the countersinker and the peripheral surface of the drill.

Through U.S. Pat. No. 3,635,573 is also known a tool comprising a drill on which a countersinker is provided. The countersinker has an internal hole, which has a diameter that is somewhat larger than the external diameter of the drill. This means that the countersinker can be mounted on the drill by pushing it on the drill in its axial direction. Fixation of the countersinker, relative to the drill, is made through a substantially radially directed screw that extends through the wall of the countersinker and is received at its free end within a chip flute of the drill. Thereby the countersinker is fixed relative to the drill both in axial and circumferential directions.

A general problem of the above described countersinkers is that since the internal hole of each countersinker is circular and the drill is provided with a number chip flutes, spaces will be formed between the internal bore wall of the countersinker and the chip flutes, such that chips will frequently get stuck in said spaces. This leads to chip stoppage.

Sweden Patent No. 62052 discloses a one-piece countersinker held to the drill by means of a screw. The known countersinker needs bushings to remain in the wanted axial position.

OBJECTS OF THE INVENTION

A primary object of the present invention is to provide a tool and a countersinker of the above-captioned type, wherein the tool carrying the countersinker, does not, to the utmost possible extent, lead to chip stoppage.

Still another object of the present invention is to provide a tool where driving of the countersinker will depend on an interference contact between co-operative surfaces, and not through friction.

Still another object of the present invention is to provide a tool where cutting inserts of the countersinker will obtain an exact positioning in the axial and circumferential directions of the drill.

Still another object of the present invention is to provide a tool where the countersinker shall have a relatively low weight.

SUMMARY OF THE INVENTION

The invention pertains to a tool for chip removing machining. The tool comprises a drill and a countersinker mounted thereto. The countersinker has at least one insert seat for receiving a cutting insert. The drill defines an axis of rotation and is provided with at least one chip flute extending in a generally axial direction of the drill. The countersinker includes a connection portion received in the chip flute and configured with a shape generally corresponding to that of the chip flute, so as to be form-locked therein. Preferably, the connection portion defines a section of a wall of a chip-removal channel defined by the chip flute.

BRIEF DESCRIPTION OF THE DRAWINGS

The objects and advantages of the invention will become apparent from the following detailed description of a preferred embodiment thereof in connection with the accompanying drawings, in which like numerals designate like elements, and in which.

DETAILED DESCRIPTION OF A PREFERRED EMBODIMENT OF THE INVENTION

Figure 1:
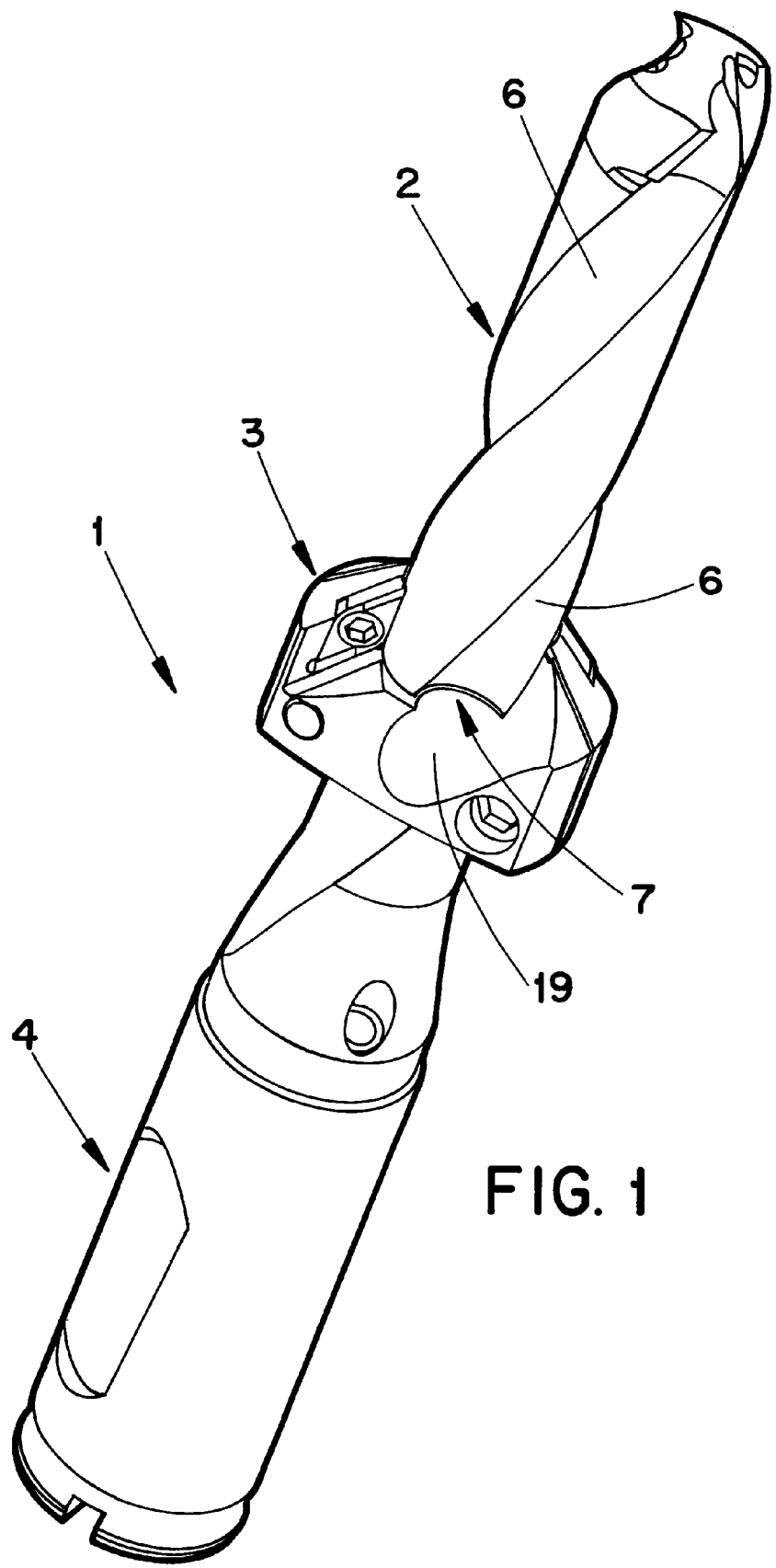
FIG. 1 shows a perspective view of a tool according to the present invention, i.e. a drill, on which a countersinker is mounted.
Figure 2:
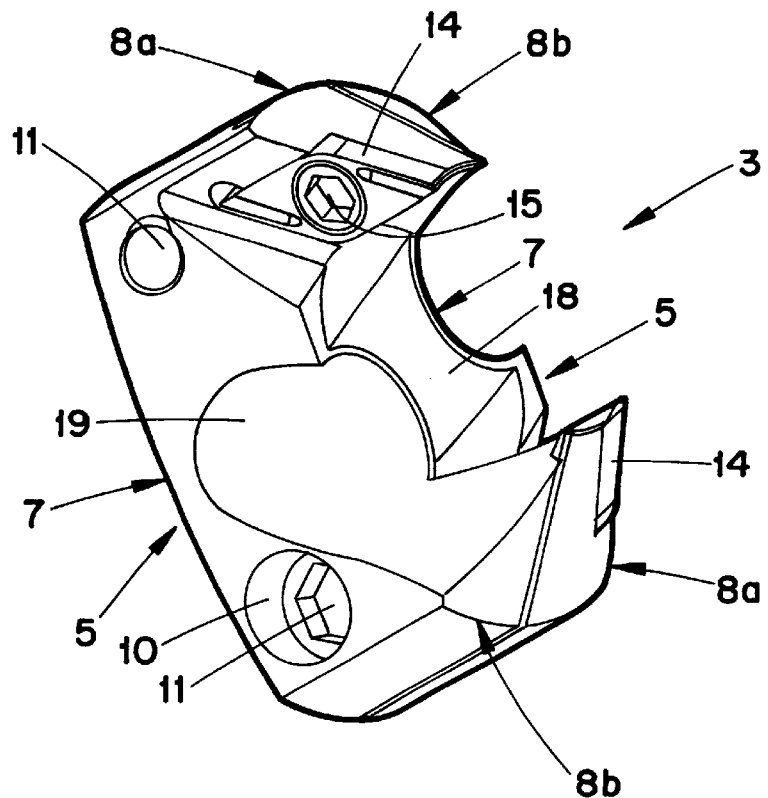
FIG. 2 shows a perspective view of a countersinker according to the present invention.
Figure 7:
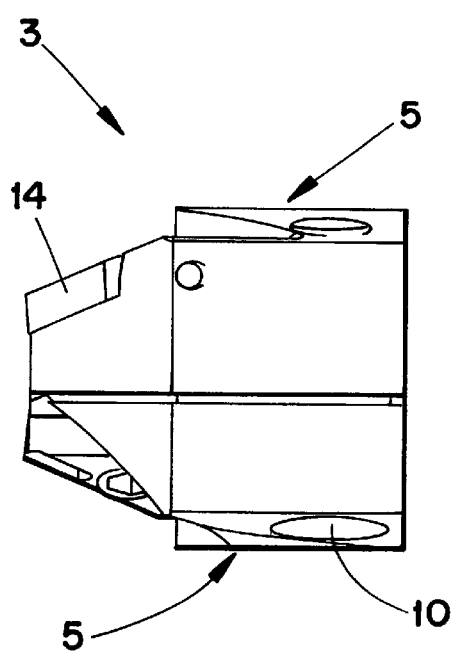
FIG. 7 shows a side view of the countersinker according to FIG. 2, as viewed towards a shorter side of the countersinker.

FIG. 1 shows a tool according to the present invention which comprises a conventional helix drill 1, which has a tool part 2 as well as a shank 4, which shank is intended to be received in a holder (not shown) of a machine tool. A number of chip flutes 6 are formed in the tool part 2, i.e., two flutes in the shown embodiment, which run helically along the tool part 2. Each chip flute defines a chip-removal channel. A countersinker 3 according to the present invention is provided on the tool part 2.

Figure 3:
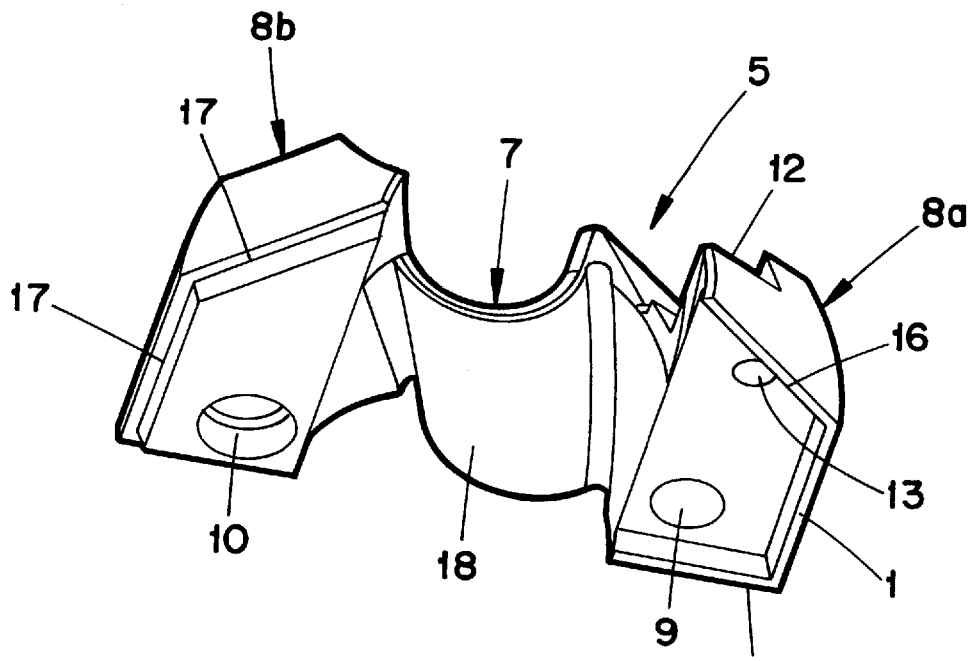
FIG. 3 shows a perspective view of a half of the countersinker according to FIG. 2.
Figure 4:
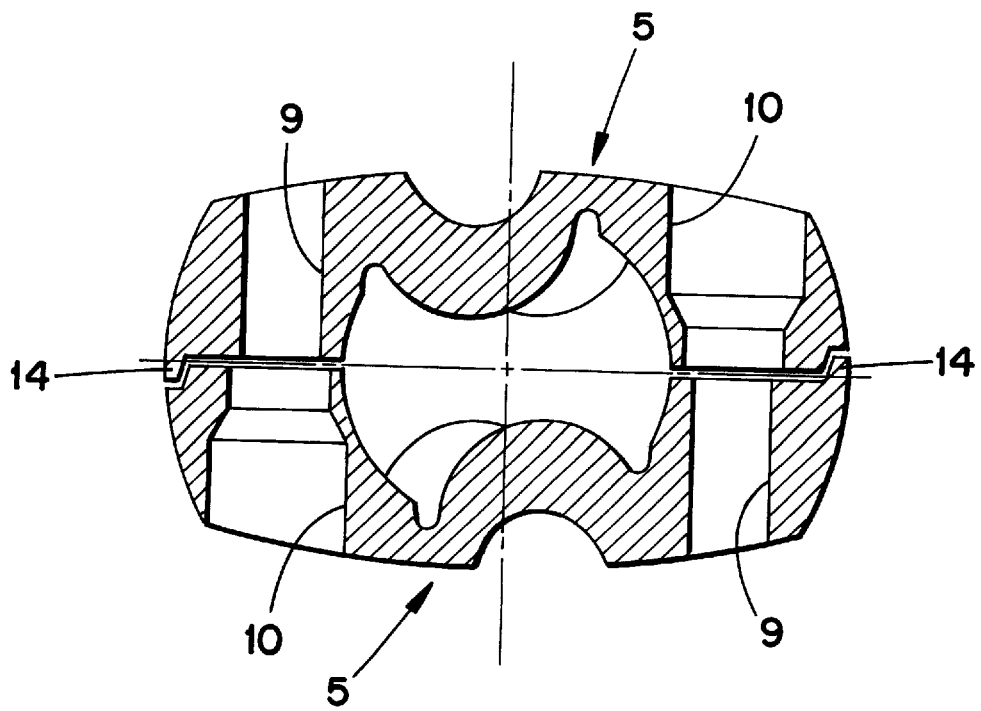
FIG. 4 shows a cross-section through the countersinker according to FIG. 2, wherein the cross-section lies in a plane perpendicular to the axis of rotation of the drill in FIG. 1.
Figure 5:
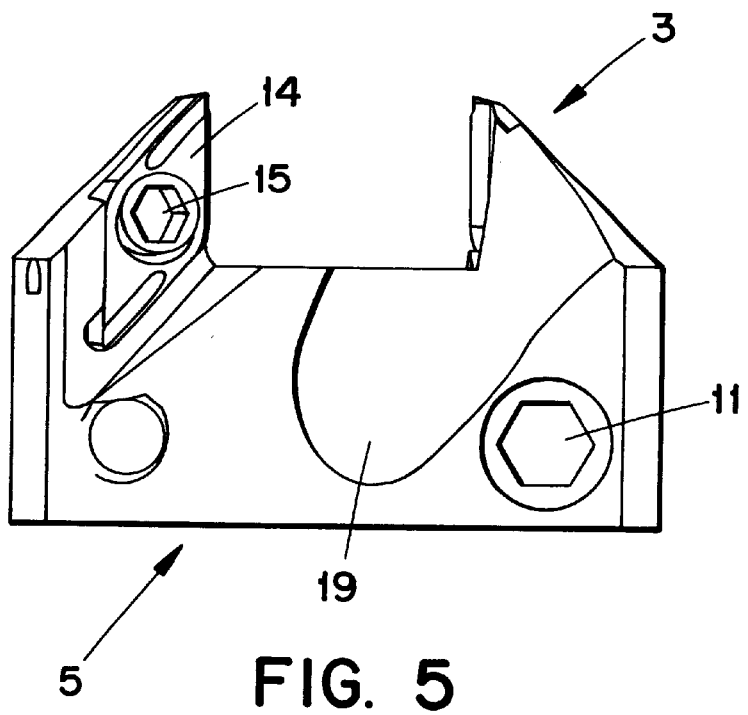
FIG. 5 shows a side view of the countersinker according to FIG. 2, as viewed towards a longer side of the countersinker.
Figure 6:
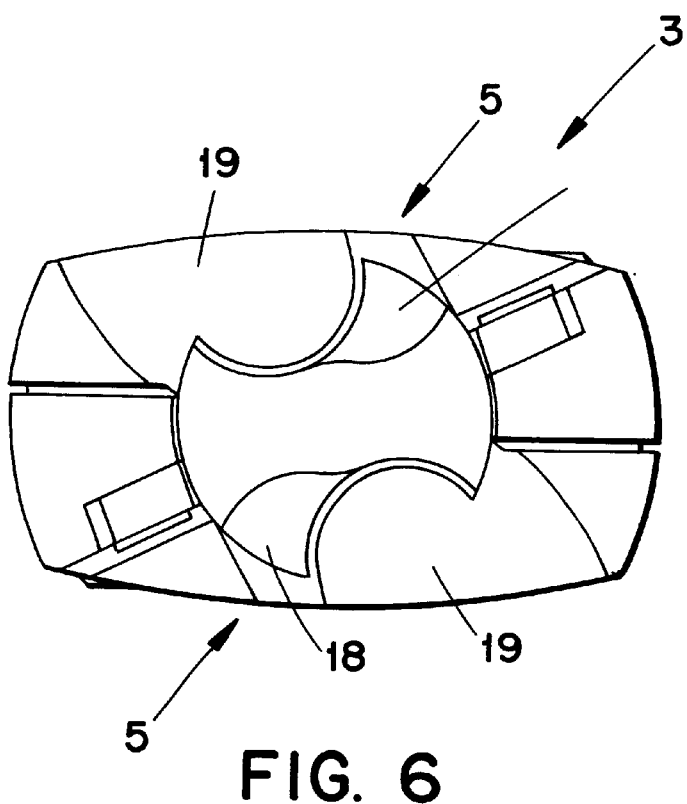
FIG. 6 shows an end view of the countersinker according to FIG. 2, as viewed towards the end which is provided with cutting inserts.

The countersinker 3 according to the present invention shown in FIGS. 1–7 comprises two identical halves 5, only one half is shown in FIG. 3. Each half 5 has a first joining portion 8a and a second joining portion 8b, which are mutually connected by a connection portion 7. Each half 5 has a first through hole 9 in the first joining portion 8a and a second through hole 10 in the second joining portion 8b. The first or the second through hole 9 and 10, respectively, is intended to receive, together with the opposite, cooperative hole 10 and 9, respectively, of the second half 1, a first screw 11, see FIG. 2. Thereby is understood that the first through hole 9 is internally threaded.

The first joining portion 8a of each half 5 also has a cutting insert pocket 12, see FIG. 3, with an associated internally threaded third hole 13. In the insert pocket 12 a cemented carbide cutting insert 14 is received and secured by means of a second screw 15, which extends into in the third hole 13.

The joining portion 8a is provided with a collar 16 at the side facing away from the insert pocket 12, which collar is formed by three substantially straight portions. The collar 16 constitutes in principle an extension of the external bordering surfaces of the first joining portion 3.

The second joining portion 8b has a notch 17 at the same side of the half 5 as the collar 16, where material has been removed along the three external edges of the second joining portion 8b. The collar 16 is received by the notch 17 in an assembled state of both halves 5, see FIG. 4, whereby a so called labyrinth seal is formed, which in an efficient manner prevents chips from entering between the halves 5.

The connection portion 7 of each of the halves 5 generally has a shape that corresponds to a part of a respective helical chip flute 6 of the tool part 2. Thus, the connection portion 7 comprises a convex surface 18, see FIG. 3, which extends helically in the axial direction of the drill 1 when the countersinker 3 is mounted to the drill 1. The convex surface 18 is situated at the side of the countersinker 3 that in an assembled state thereof is facing towards the drill 1. The connection portion 7 also comprises a concave surface 19, see FIG. 2, which extends helically in the axial direction of the drill 1 when the countersinker 3 is mounted to the drill 1. The concave surface 19 is situated at the side of the countersinker 3 that in an assembled state thereof faces away from the drill 1. The concave and convex surfaces possess substantially the same cross sectional curvature and helical curvature as the chip flute. Consequently, the convex surface 18, in an assembled state of the countersinker 3, will be form-locked to a chip flute 6 of the drill 1 to which the countersinker 3 is mounted. Preferably, the convex surface 18 is pressed against the wall of the channel, whereby the convex surface 18 forms a section of the wall of the chip-removal channel.

From FIG. 1 is evident how the connection portion 7 is received in a chip flute 6 of the helical drill 1 forming part of the tool according to the present invention. When mounting the countersinker 3 to the drill 1, the first screws 11 are unscrewed such that the available space between the halves 5 becomes somewhat enlarged. Thereby it is possible to "screw" the countersinker 3 onto the drill 1 from its free end, whereby the displacement of the countersinker 3, along the axial direction the drill 1, continues until the countersinker 3 has assumed the wanted position on the tool part 2. Subsequently, the first screws 11 are tightened and the countersinker 3 is thereby fixed axially and circumferentially on the tool part 2 of the drill 1. The connection portion 7 of each half 5 will be received by the associated chip flute 6 of the helix drill 1 and the convex surface 18 comes into form-locked abutment against the associated chip flute 6. Therefore, the ability of chips to enter between the countersinker 3 and the drill 1 is prevented in an extremely effective manner. The associated concave surface 19, at the external surface of the countersinker 3, thereby will serve as a chip flute, i.e., the concave surface 19 forms in principle, an extension of the associated chip flute 6 at the external surface of the countersinker 3.

The connection portion 7 is form-locked and received in an associated chip flute 6 in connection with fixation of the countersinker 3 on the drill 1 by tightening of the first screws 11, which causes an extraordinary reliable driving of the countersinker 3 when the drill 1 rotates. Through the compulsive guiding between the chip flute 6 and the connection portion 7, it is ensured that the cutting inserts 14 of the countersinker 3 are always situated at a protruding land of the drill 1.

The fact that the countersinker 3 is not symmetrical about the axis of rotation, but rather has a generally elongated flat shape, means that its weight is reduced as compared to a symmetrical countersinker.

According to the shown embodiment, the countersinker 3 is provided with two diametrically oppositely positioned cutting inserts 14, which are fixed in their respective insert pockets by means of second screws 15. During operation of the tool according to the present invention, i.e. when the drill 1 generates a hole, the cutting inserts 14 will, during the end of the machining operation, produce a countersink or chamfer around the hole formed by the drill. Chips are generated during the entire machining operation and these chips are transported in the chip flutes 6, from the drill tip in a direction towards the shank. Thus, at the end of the machining operation, also the cutting inserts 14 will generate chips, which likewise shall be transported away from the cutting inserts 14. Most chips shall pass the countersinker 3. The chips which are transported in the chip flutes 6, i.e. the chips which have been generated by the drill tip, will be guided past the countersinker 3 via the concave surface 19, which in principle constitutes an extension of the wall of the chip-removal channel of associated chip flute 6.

On the other hand, the chips that are generated by the cutting inserts 14 will generally not need any chip flutes. Since the connection portion 7 in which the concave surface 19 is included, is connected by being form-locked to the associated chip flute 6 via the convex surface 18, there is, in principle, no risk that chip stoppage will occur at the interface between the drill 1 and the countersinker 3.

By the expression "form-locked" or the like, it is not meant that the cooperating surfaces of the connection portion 7 and the respective chip flute must abut absolutely tightly against each other, but rather there can be a gap between portions of the cooperating surfaces. It shall be noted in this connection that co-operation between the discussed surfaces must cause an adequate fixation of the countersinker 3 on the drill 1, both the axial and circumferential directions of the drill 1.

MODIFICATIONS OF THE INVENTION

According to the above described embodiment of a tool according to the present invention, there is provided a conventional helix drill 1, i.e., the chip flutes 6 extend helically in the longitudinal direction of the drill 1. However one can within the framework of the present invention envision other types of drills, for example those with straight chip flutes which extend exactly in the axial direction of the drill. Naturally, such an adaptation of the countersinker according to the present invention would require a reshaping of the connection portion, the final shape being dependent on the type of drill on which the countersinker shall be mounted.

According to the above-described embodiment the countersinker 3 is shaped to cooperate with two chip flutes 6. However within the framework of the present invention the countersinker can be formed such to cooperate with other numbers of chip flutes, naturally depending on how many chip flutes are possessed by the drill on which the countersinker shall be mounted.

According to the above-described embodiment of the countersinker according to the present invention there are provided two diametrically oppositely positioned cutting inserts 14. However one can within the framework of the invention conceive of a countersinker provided with only one cutting insert, although it may be necessary to take measures to deal with problems involving tool imbalance when the tool is in operation.

According to the above-described embodiment the countersinker 3 consists of two identical halves 5, which are mutually connected by means of two screws 11. However, one can within the framework of the present invention also conceive of halves that are not completely identical and which are mutually connected with a hinge mounting at one end of the countersinker and which employ a screw or similar to connects the halves in the area of the other end of the countersinker.

Although the present invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A tool for chip removing machining comprising a drill and a countersinker mounted thereto, the countersinker having at least one insert seat for receiving a cutting insert for chip removing machining, said drill defining an axis of rotation and provided with at least one chip flute extending in a generally axial direction of the drill to form a chip-removal channel, the countersinker including a connection portion received in the chip flute and configured with a form generally corresponding to that of the chip flute, wherein the connection portion is form-locked to the chip flute.

2. The tool according to claim 1 wherein the connection portion defines a section of a wall of the chip removal channel.

3. The tool according to claim 1, wherein the countersinker comprises two sections that are clamped to the drill.

4. The tool according to claim 1 wherein the countersinker comprises two separate sections that are clamped together against the drill by two fasteners.

5. The tool according to claim 4 wherein the connection portion is disposed entirely on one of the sections.

6. The tool according to claim 4 wherein the drill includes two of the flutes, the countersinker including two connection portions disposed on respective ones of the sections and received in respective ones of the flutes.

7. The tool according to claim 4 wherein the two sections are of identical configuration.

8. The tool according to claim 7 wherein each of the sections includes two joining portions interconnected by one of the connection portions.

9. The tool according to claim 8 wherein each joining portion is connected to a joining portion of the other section by a screw.

10. The tool according to claim 1 wherein the connection portion includes a convex surface facing the flute, and an oppositely disposed concave surface defining a portion of the chip-removal channel.

11. The tool according to claim 10 wherein the convex surface is pressed against a concave surface of the wall of the chip flute.

12. The tool according to claim 1 wherein the flute is a helical flute.

13. The tool according to claim 1 wherein the countersinker includes two of the insert seats, arranged diametrically opposite one another.

14. A countersinker adapted to be mounted on a drill for chip removing machining, the countersinker having at least one insert seat for receiving a cutting insert, the countersinker including a connection portion configured with a form generally corresponding to a flute of a drill to establish a form-locked connection with the drill, the countersinker comprising two sections adapted to be clamped together and to the drill.

15. The countersinker according to claim 14 wherein there are two of the connection portions disposed on respective ones of the sections, wherein the sections are separate from one another and are identical construction, each section including two joining portions interconnected by a respective connection portion.

16. The countersinker according to claim 15 wherein the connection portion of each section includes a convex surface facing a convex surface of the other section; each connection portion further including a concave surface facing away from the respective convex surface.

17. The countersinker according to claim 14 wherein one of the joining portions of each of the sections includes a collar, and the other joining portion of the same section includes a notch, wherein when such sections are clamped together, the collar and the notch of one section are mated with the notch and the collar, respectively, of the other section.

\* \* \* \* \*